(12) United States Patent
Masuda

(10) Patent No.: US 6,807,327 B2
(45) Date of Patent: Oct. 19, 2004

(54) SEMICONDUCTOR OPTICAL DEVICE

(75) Inventor: Takeyoshi Masuda, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 20 days.

(21) Appl. No.: 10/411,270

(22) Filed: Apr. 11, 2003

(65) Prior Publication Data

US 2003/0194193 A1 Oct. 16, 2003

(30) Foreign Application Priority Data

Apr. 12, 2002 (JP) .................................. P2002-111139

(51) Int. Cl.[7] .................... G02B 6/22; G02B 6/10; H01S 5/026; H01L 29/02; H01L 31/12
(52) U.S. Cl. .................... 385/14; 385/129; 385/130; 385/131; 372/45; 372/46; 372/50; 257/79
(58) Field of Search .................... 385/14, 129, 130, 385/131; 372/45, 46, 20; 257/79

(56) References Cited

U.S. PATENT DOCUMENTS

| 4,425,650 A | 1/1984 | Mito et al. |
| 4,597,085 A | 6/1986 | Mito et al. |
| 5,953,149 A | 9/1999 | Ishizaka |
| 6,034,983 A | * 3/2000 | Fujii et al. .................... 372/50 |
| 6,044,097 A | 3/2000 | Kawamura et al. |
| 6,141,363 A | * 10/2000 | Ougazzaden et al. .......... 372/45 |
| 6,167,070 A | * 12/2000 | Sakata .......................... 372/45 |
| 6,546,034 B2 | * 4/2003 | Komori et al. ................ 372/46 |
| 2003/0146440 A1 | * 8/2003 | Murata et al. ................. 257/79 |

* cited by examiner

Primary Examiner—John R. Lee
Assistant Examiner—Mary El-Shammaa
(74) Attorney, Agent, or Firm—McDermott Will & Emery LLP

(57) ABSTRACT

A multilayer semiconductor portion is provided on a semiconductor substrate on side faces of a semiconductor portion. A second conductive type III-V compound semiconductor layer is provided on the semiconductor portion and the multilayer semiconductor portion. The multilayer semiconductor portion has first to fourth semiconductor layers sequentially arranged on the semiconductor substrate. The first semiconductor layer is a first conductive type III-V compound semiconductor layer extending along the side face of the semiconductor portion and a principal surface of the semiconductor substrate. The second semiconductor layer is a second conductive type III-V group compound semiconductor layer extending along the first semiconductor layer. The third semiconductor layer is a first conductive type III-V compound semiconductor layer extending along the second semiconductor layer. The fourth semiconductor layer is a second conductive type III-V compound semiconductor layer provided on the third semiconductor layer.

20 Claims, 11 Drawing Sheets

SEMICONDUCTOR OPTICAL DEVICE

BACKGROUND OF THE INVENTION

1. Field of the Invention

The present invention relates to a semiconductor optical device.

2. Related Background Art

The semiconductor optical device includes an n-type semiconductor substrate, a semiconductor optical waveguide disposed on a surface of the semiconductor substrate, a burying portion disposed around the semiconductor optical waveguide, and a p-type clad layer disposed on the semiconductor optical waveguide and the burying portion. The burying portion buries the semiconductor optical waveguide. The semiconductor optical waveguide includes an n-type semiconductor layer disposed on the n-type semiconductor substrate, an active layer disposed on the n-type semiconductor layer, and a p-type semiconductor layer disposed on the active layer. The burying portion is constituted of two semiconductor films, and includes a p-type semiconductor film disposed on the n-type semiconductor substrate, and an n-type semiconductor film disposed on the p-type semiconductor film. The semiconductor optical device includes a cathode electrode disposed on the backside of the n-type semiconductor substrate, and an anode electrode disposed on the p-type clad layer.

SUMMARY OF THE INVENTION

In the semiconductor optical device, the n-type substrate and the p-type semiconductor film of the semiconductor burying portion forms a pn junction, the p-type clad layer and the n-type semiconductor film of the buried portion forms a pn junction, and the p-type semiconductor film and the n-type semiconductor film of the semiconductor burying portion forms a pn junction. When an electrical signal is applied between the anode electrode and the cathode electrode of the semiconductor optical device, a reverse bias voltage is applied to one of the pn-junctions. The reverse-biased pn junction of the burying portion blocks electric current and no electric current flows through the burying portion including the reverse-biased pn-junction. But the reverse-biased pn junction produces depletion capacitance. According to the inventors' studies, the capacitance in the burying portion should be reduced in order to enable the semiconductor optical device to operate at a high speed.

It is an object of the present invention to provide a semiconductor optical device having a structure capable of reducing the capacitance.

One aspect of the present invention is a semiconductor optical device. The semiconductor optical device comprises: a semiconductor substrate; a semiconductor portion; a multilayer semiconductor portion; and a second conductive type semiconductor layer. The semiconductor substrate has a first conductive type thereof. The semiconductor portion includes first and second III-V compound semiconductor layers and an active layer. The semiconductor portion is provided on the semiconductor substrate, and the semiconductor portion has a side face extending in a direction of a predetermined axis. The active layer is provided between the first and second III-V compound semiconductor layers. The multilayer semiconductor portion is provided on the semiconductor substrate and the side face of the semiconductor portion. The second conductive type semiconductor layer is provided on the semiconductor portion and the multilayer semiconductor portion. The multilayer semiconductor portion has first to fourth semiconductor layers sequentially arranged on the semiconductor substrate. The first semiconductor layer is a second conductive type III-V compound semiconductor layer extending on the side face of the semiconductor portion and the semiconductor substrate. The second semiconductor layer is a first conductive type III-V compound semiconductor layer provided on the first semiconductor layer. The third semiconductor layer is a second conductive type III-V compound semiconductor layer extending on the second semiconductor layer. The fourth semiconductor layer is a first conductive type III-V compound semiconductor layer provided on the third semiconductor layer. Each semiconductor layer of the first to fourth semiconductor layers and a semiconductor region adjacent to the semiconductor layer constitutes one of a pn junction and a pin junction.

The semiconductor optical device according to the present invention further comprises: a first electrode and a second electrode. The first electrode is electrically connected to the first III-V compound semiconductor layer of the semiconductor portion. The second electrode is electrically connected to the second III-V compound semiconductor layer of the semiconductor portion.

According to another aspect of the present invention, a semiconductor optical device comprises: a first conductive type III-V compound semiconductor portion; a second conductive type III-V compound semiconductor portion; a semiconductor portion; and a multilayer semiconductor portion. The first conductive type III-V compound semiconductor portion extends along a first reference plane intersecting a predetermined axis. The second conductive type III-V compound semiconductor portion extends along a second reference plane intersecting the predetermined axis. The semiconductor portion has side faces. The semiconductor portion is provided between the first conductive type III-V compound semiconductor portion and the second conductive type III-V compound semiconductor portion. The semiconductor portion includes first and second III-V compound semiconductor layers and an active layer. The active layer is provided between the first and second III-V group compound semiconductor layers. The multilayer semiconductor portion has first to fourth semiconductor layers. The first to fourth semiconductor layers are provided between the first conductive type semiconductor portion and the second conductive type semiconductor portion. The multilayer semiconductor portion is provided on the side faces of the semiconductor portion. Each layer of the first to fourth semiconductor layers is adjacent to semiconductor regions of the following: the remaining of the semiconductor layers of the first to fourth semiconductor layers; the first conductive type III-V compound semiconductor potion; and the second conductive type III-V compound semiconductor portion. Each of the first to fourth semiconductor layers has a conductive type different from that of the adjacent semiconductor region.

The semiconductor optical device according to the present invention further comprises: a first electrode; and a second electrode. The first electrode is electrically connected to the first III-V compound semiconductor layer of the semiconductor portion. The second electrode is electrically connected to the second III-V compound semiconductor layer of the semiconductor portion.

In the semiconductor optical device, the first semiconductor layer of the multiplayer semiconductor portion includes first and second layered semiconductor regions. An impurity concentration of the first layered semiconductor region is lower than that of the second layered semiconductor region. The first layered semiconductor region is provided between the second layered semiconductor region and the substrate. The impurity concentration of the first layered semiconductor region is lower than that of the substrate.

The semiconductor optical device according to the present invention further comprises a pair of trenches provided in the first to fourth semiconductor layers of the multilayer semiconductor portion. The semiconductor portion is located between the trenches.

In the semiconductor optical device, the active layer includes a light generating region provided for a semiconductor light generation element.

In the semiconductor optical device, the active layer includes an optical absorption region provided for an optical modulator.

In the semiconductor optical device, the active layer includes an optical absorption region provided for a semiconductor photodetector.

In the semiconductor optical device, the semiconductor portion includes a first portion provided to constitute one of an optical modulator and a semiconductor photodetector, and a second portion provided to constitute a semiconductor light generation element. An impurity concentration of the first semiconductor layer has a highest value smaller than that of the second semiconductor layer.

In the semiconductor optical device, the semiconductor portion includes a first portion provided to constitute one of an optical modulator and a semiconductor photodetector, and a second portion provided to constitute a semiconductor light generation element. An impurity concentration of the first semiconductor layer has a highest value smaller than that of the semiconductor substrate. An impurity concentration of the second semiconductor layer is larger than the highest value of the impurity concentration of the first semiconductor layer.

In the semiconductor optical device, the semiconductor portion includes a first portion provided to constitute one of an optical modulator and a semiconductor photodetector, and a second portion provided to constitute a semiconductor light generation element. The first semiconductor layer of the multilayer semiconductor portion includes first and second layered semiconductor regions. An impurity concentration of the first layered semiconductor region is lower than that of the second layered semiconductor region. The first layered semiconductor region is provided between the semiconductor substrate and the second layered semiconductor region.

According to still another aspect of the present invention, a semiconductor optical device comprises: a semiconductor substrate; a semiconductor portion; a multilayer semiconductor portion; and a second conductive type semiconductor layer. The semiconductor substrate has a first conductive type. The semiconductor portion includes first and second III-V compound semiconductor layers and an active layer. The semiconductor portion is provided on the semiconductor substrate. The semiconductor portion has a side face extending in a direction of a predetermined axis. The active layer is provided between the first and second III-V compound semiconductor layers. The multilayer semiconductor portion is provided on the semiconductor substrate and the side face of the semiconductor portion. The second conductive type semiconductor layer is provided on the semiconductor portion and the multilayer semiconductor portion. The multilayer semiconductor portion has first to 2n-th semiconductor layers sequentially arranged on the semiconductor substrate, where the number n is equal to or more than two. The first semiconductor layer is provided on the semiconductor substrate and the side face of the semiconductor portion. The 2m-th semiconductor layer is a first conductive type III-V compound semiconductor layer, where the number m is integer and not more than n. The (2m−1)-th semiconductor layer is a second conductive type III-V compound semiconductor layer. Each layer of the first to 2n-th semiconductor layers is adjacent to another layer of the first to 2n-th semiconductor layers to constitute one of a pn junction and a pin junction.

According to still another aspect of the present invention, a semiconductor optical device comprises: a first conductive type III-V compound semiconductor portion; a second conductive type III-V compound semiconductor portion; a semiconductor portion; and a multilayer semiconductor portion. The first conductive type III-V compound semiconductor portion extends along a first reference plane intersecting a predetermined axis. The second conductive type III-V compound semiconductor portion extends along a second reference plane intersecting the predetermined axis. The semiconductor portion has side faces. The semiconductor portion is provided between the first conductive type III-V compound semiconductor portion and the second conductive type III-V compound semiconductor portion. The semiconductor portion includes first and second III-V compound semiconductor layers and an active layer. The active layer is provided between the first and second III-V group compound semiconductor layers. The multilayer semiconductor portion has first to 2n-th semiconductor layers. The first to 2n-th semiconductor layers is provided sequentially between the first conductive type semiconductor portion and the second conductive type semiconductor portion. The multilayer semiconductor portion is provided on the side faces of the semiconductor portion. The 2m-th semiconductor layer has a first conductive type, where the number m is integer and not more than n. The (2m−1)-th semiconductor layer has a second conductive type. Each layer of the first to 2n-th semiconductor layers is adjacent to another layer of the first to 2n-th semiconductor layers to constitute one of a pn junction and a pin junction.

The foregoing and other features, utilities and advantages of the invention will be apparent from the following more particular description of a preferred embodiment of the invention as illustrated in the accompanying drawings.

BRIEF DESCRIPTION OF THE DRAWINGS

To facilitate understanding, identical reference numerals have been used, where possible, to designate identical elements that are common to the figures.

DESCRIPTION OF THE PREFERRED EMBODIMENTS

The teaching of the present invention can be easily understood by considering the following detailed description with reference to the accompanying drawings shown as exemplification. Now, embodiments according to the present invention will be described with reference to the accompanying drawings.

(First Embodiment)

Figure 1:
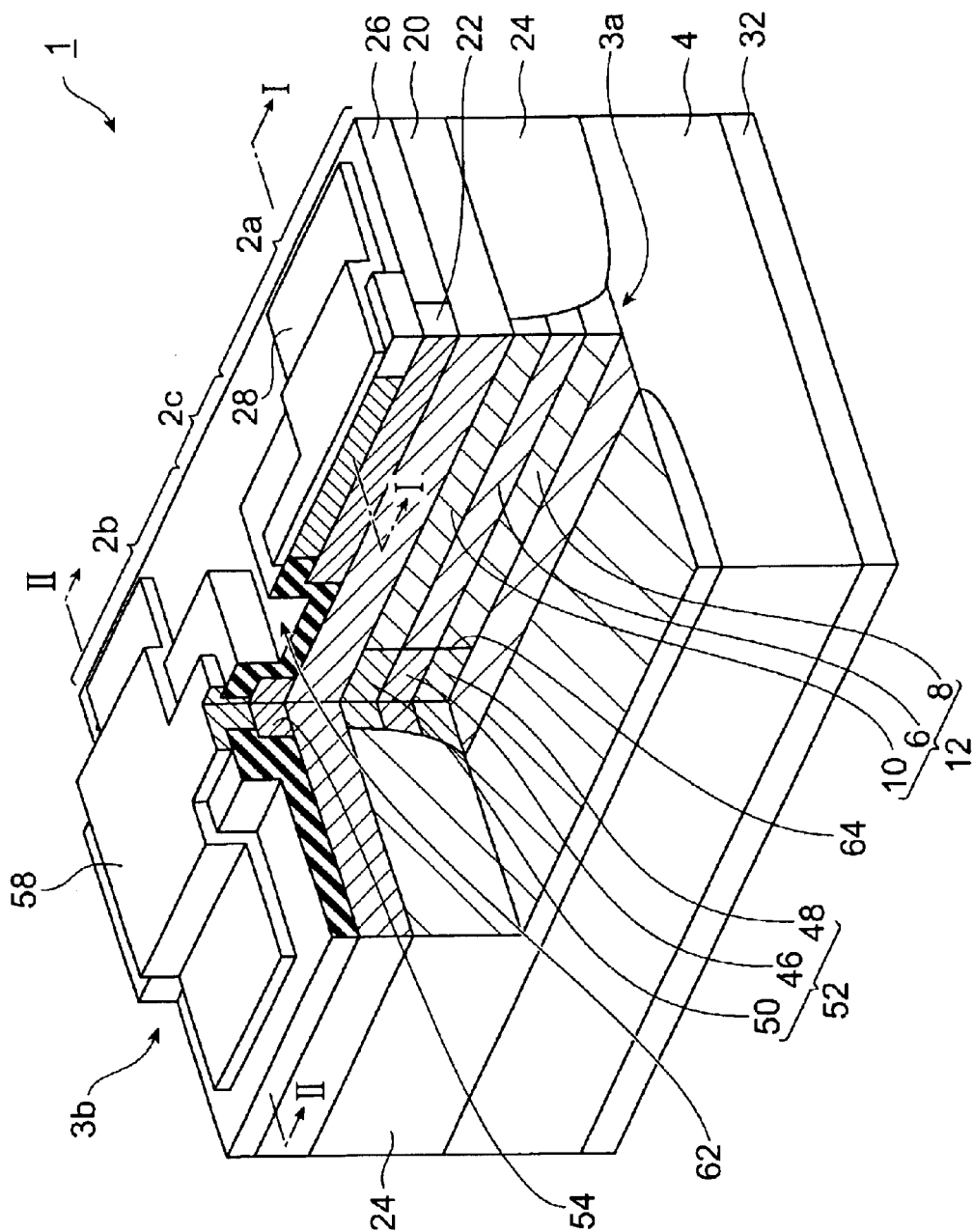
FIG. 1 is a perspective view showing a semiconductor optical integrated device according to a first embodiment.
Figure 2A:
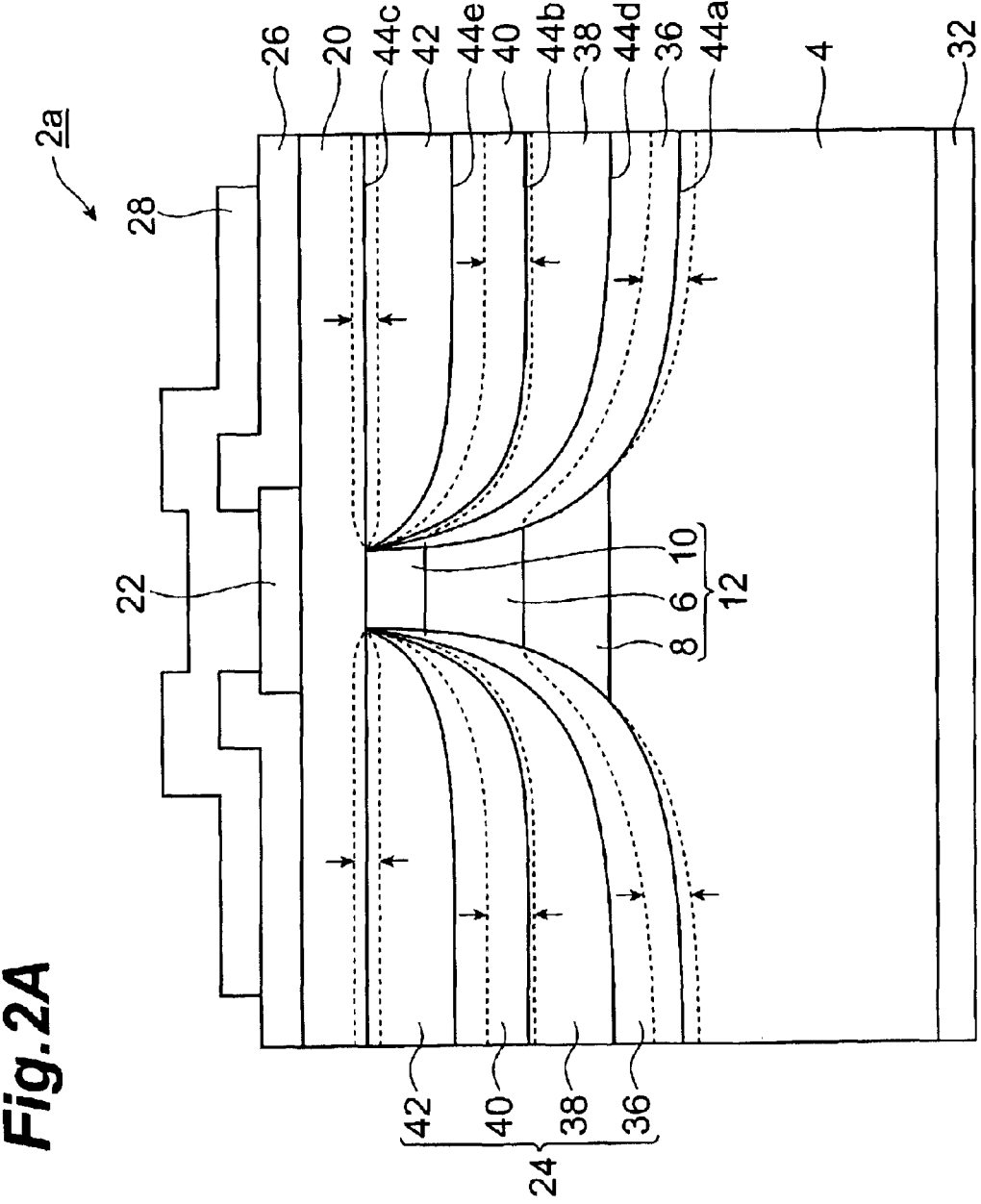
FIG. 2A is a sectional view taken along the line I—I.
Figure 2B:
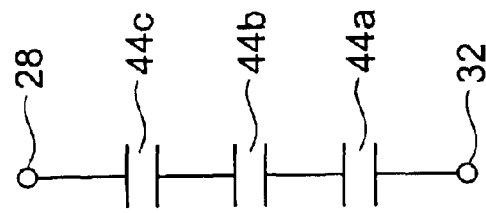
FIG. 2B shows an equivalent circuit of a multilayer semiconductor portion.
Figure 3:
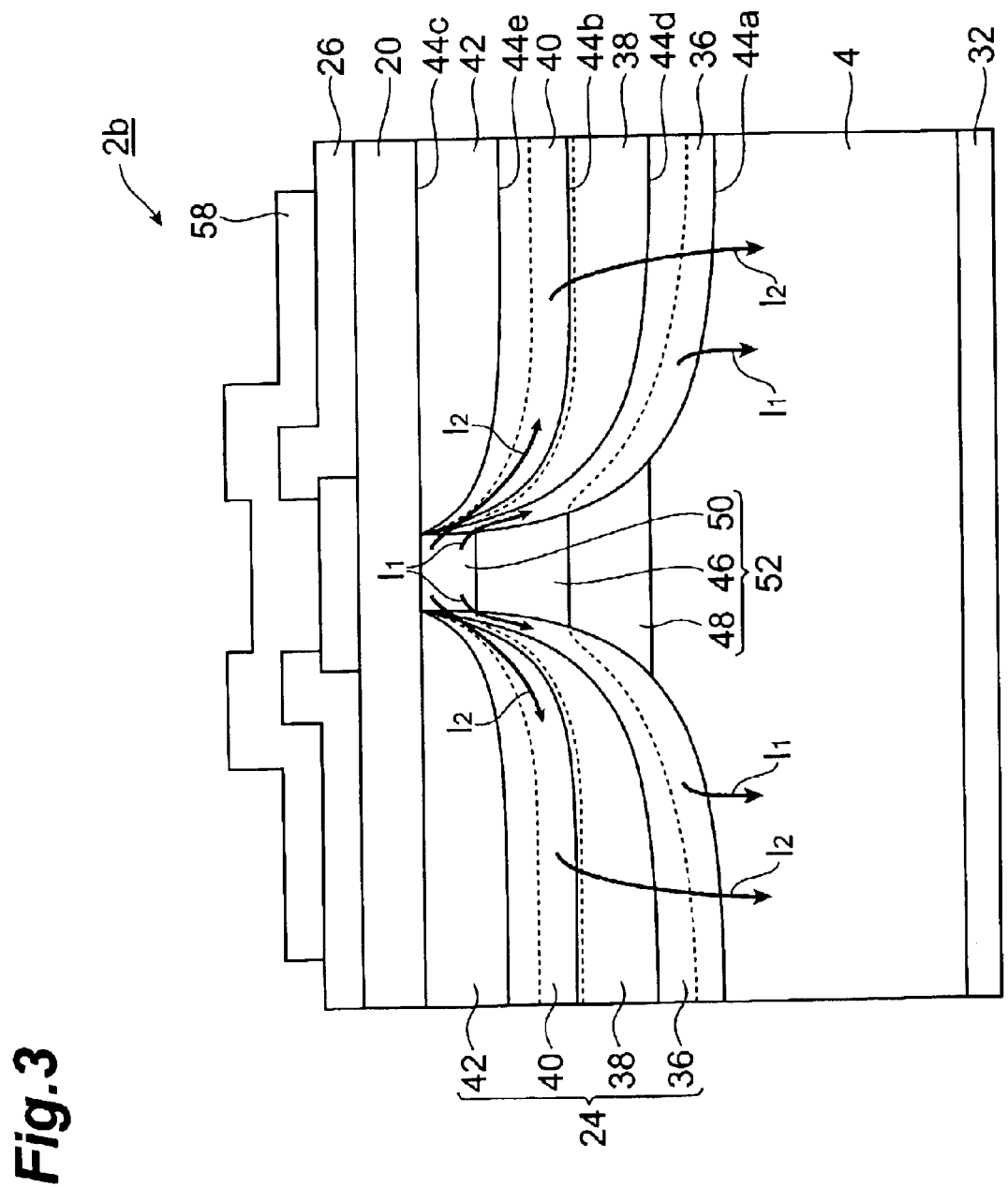
FIG. 3 is a sectional view taken along the line II—II.

FIG. 1 is a perspective view showing a semiconductor optical integrated device according to a first embodiment. FIG. 2A is a sectional view taken along the line I—I. FIG. 2B shows an equivalent circuit of a multilayer semiconductor portion. FIG. 3 is a sectional view taken along the line II—II.

The semiconductor optical integrated device according to the first embodiment will be described with reference to FIG. 1. The semiconductor optical integrated device 1 includes a semiconductor modulation element portion 2a, a semiconductor light generation element portion 2b and a semiconductor isolation element portion 2c. The semiconductor optical integrated device 1 has a pair of end faces 3a and 3b. The semiconductor modulation element portion 2a, the semiconductor light generation element portion 2b and the semiconductor isolation element portion 2c are arranged between the end surfaces 3a and 3b. The semiconductor modulation element portion 2a is optically coupled through the semiconductor isolation element portion 2c to the semiconductor light generation element portion 2b. The semiconductor light generation element portion 2b can generate light of a predetermined wavelength. The semiconductor modulation element portion 2a can modulate the light received from the semiconductor light generation element portion 2b. The semiconductor isolation element portion 2c is provided to increase electrical isolation resistance between the semiconductor modulation element portion 2a and the semiconductor light generation element portion 2b. The semiconductor modulation element portion 2a, the semiconductor light generation element portion 2b and the semiconductor isolation element portion 2c are provided on a semiconductor substrate 4, such as an n$^+$-type InP semiconductor substrate.

The semiconductor modulation element portion 2a comprises an optical waveguide mesa portion 12. The optical waveguide mesa portion 12 includes an active layer 6, a semiconductor layer 8 such as an n-type clad layer, and a semiconductor layer 10 such as a p-type clad layer. The active layer 6 is provided on the substrate 4. The active layer 6 is made of III-V compound semiconductor material and is provided between the n-type semiconductor layer 8 and the p-type semiconductor layer 10. The semiconductor layer 8 is made of n-type III-V compound semiconductor material. The semiconductor layer 10 is made of III-V compound semiconductor material. The n-type semiconductor layer 8 and the p-type semiconductor layer 10 are provided on the substrate 4. The active layer 6 can be constituted of a single semiconductor layer. However, the active layer 6 is not limited to such a single semiconductor layer, and can have an SQW structure or an MQW structure. Additionally, the active layer 6 may have an SCH structure. Since the refractive index of the active layer 6 is larger than those of the n-type semiconductor layer 8 and the p-type semiconductor layer 10, the n-type semiconductor layer 8 and the p-type semiconductor layer 10 serve to confine light in the active layer 6. These semiconductor layers 6, 8 and 10 constitute an optical waveguide structure.

According to the embodiment, the semiconductor light generation element portion 2b includes an optical waveguide mesa portion 52, the structure of which is similar to that of the semiconductor modulation element portion 2a. In the semiconductor light generation element 2b, the optical waveguide mesa portion 52 includes an active layer 46, an n-type semiconductor layer 48 such as an n-type clad layer, and a semiconductor layer 50 such as a p-type clad layer. The active layer 46 is provided on the principle face of the substrate 4. The active layer 46 is made of III-V compound semiconductor material. The active layer 46 is provided between the semiconductor layer 48 containing an n-type III-V compound semiconductor and the semiconductor layer 50 containing a p-type III-V compound semiconductor. The semiconductor layer 48 and the semiconductor layer 50 are provided on the substrate 4. The active layer 46 can be constituted of a single semiconductor layer. However, the active layer 46 is not limited to such a single semiconductor layer, and can have an SQW structure or a MQW structure. Additionally, the active layer 46 may have an SCH structure. Since the refractive index of the active layer 46 is larger than those of the semiconductor layer 48 and semiconductor layer 50, the semiconductor layer 48 and the semiconductor layer 50 serve to confine light in the active layer 46. These semiconductor layers 46, 48 and 50 constitute an optical waveguide structure.

As a modification of the semiconductor optical integrated device shown in FIG. 1, the optical waveguide mesa portions 12 and 52 may include a current block portion on both side faces of the optical waveguide. The current block portion includes a high-resistance semiconductor portion having a resistance higher than that of the semiconductor layers of the optical waveguide. On this high resistance semiconductor layer, an n-type semiconductor layer is provided. This n-type semiconductor layer works to trap positive electric carriers, i.e. holes, traveling through the high resistance semiconductor portion. Because of the n-type semiconductor layer, the current block portion works to guide electric current to the optical waveguide.

The semiconductor optical integrated device 1 comprises a multilayer semiconductor portion 24 in addition to the semiconductor mesa portions 12 and 52. The multilayer semiconductor portion 24 and the semiconductor mesa portions 12 and 52 are provided between a p-type semiconductor portion 24 and an n-type III-V compound semiconductor portion, such as a semiconductor substrate 4. The multilayer semiconductor portion 24 is adjacent to the semiconductor mesa portions 12 and 52. The multilayer semiconductor portion 24 is provided on the substrate 4 and is provided on both side faces of the optical waveguide mesa portions 12 and 52. Since the refractive index of the multilayer semiconductor portion 24 is smaller than those of the active layers 6 and 46, the multilayer semiconductor portion 24 works to confine light in the active layers 6 and 46.

A p-type semiconductor layer 20 is provided on the optical waveguide mesa portions 12, 52 and the multilayer semiconductor portion 24. The p-type semiconductor layer 20 serves as a second clad layer. The light modulation semiconductor element portion 2a further includes a contact layer 22 on the p-type semiconductor layer 20. The semiconductor light generation element portion 2b further includes a contact layer 54 provided on the p-type semiconductor layer 20.

The semiconductor modulation element portion 2a comprises an ohmic electrode 28 provided on the optical waveguide mesa portion 12. The electrode 28 works as an anode. The semiconductor modulation element portion 2a comprises an insulating silicon inorganic compound layer 26, such as a silicon nitride film, a silicon oxide film or a silicon oxynitride film, between the electrode 28 and the semiconductor layer 20. The insulating layer 26 has an opening reaching the contact layer 22. The electrode 28 is electrically connected through the opening to the contact layer 22. The semiconductor modulation element portion 2a includes an ohmic electrode 32 provided on the backside of the substrate 4. The electrode 32 is provided for a cathode on the whole surface of the backside.

The semiconductor light generation element portion 2b comprises an ohmic electrode 58 provided on the optical waveguide mesa portion 52. The electrode 58 works as an anode. The semiconductor light generation element portion 2b comprises an insulating layer 26, such as an insulating silicon inorganic compound layer, provided between the electrode 58 and the semiconductor layer 20. The inorganic insulating layer 26 has an opening reaching the contact layer 54 separated from the contact layer 22. The electrode 58 is electrically connected through the opening to the contact layer 54. Additionally, the semiconductor light generation element portion 2b includes the ohmic electrode 32 provided on the backside of the substrate 4. The semiconductor light generation element portion 2b includes the ohmic electrode 32 shared with the semiconductor modulation element portion 2a. The electrode 32 can be used as a cathode for the semiconductor light generation element portion 2b.

The following is cited as a preferred embodiment:

semiconductor substrate 4: InP substrate;
active layer 6: GaInAsP layer;
 (film thickness: 300 nanometers)
semiconductor layer 8: n-type InP layer;
 (film thickness: 550 nanometers)
semiconductor layer 10: p-type InP layer;
 (film thickness: 200 nanometers)
second semiconductor layer 20: p-type InP layer;
 (film thickness: 200 nanometers)
contact layer 22: p-type GaInAs layer;
 (film thickness: 500 nanometers)
inorganic insulating layer 26: silicon nitride layer;
 (film thickness: 350 nanometers)
active layer 46: undoped GaInAsP layer;
 (film thickness: 300 nanometers)
semiconductor layer 48: n-type InP layer;
 (film thickness: 550 nanometers)
semiconductor layer 50: p-type InP layer;
 (film thickness: 200 nanometers)
contact layer 54: p-type GaInAs layer; and
 (film thickness: 500 nanometers).

In the semiconductor optical integrated device 1, the active layer 46 is provided between the n-type semiconductor layer 48 and the p-type semiconductor layer 50, and the photoluminescence wavelength of semiconductor material of the active layer 46, is slightly longer than that of the active layer 6 (the band gap of semiconductor material of the active layer 46 is smaller than that of the active layer 6 if the active layer 46 is constituted of a single semiconductor layer). This device structure is suitable for the semiconductor modulation element portion 2a working as an electroabsorption modulator.

Referring to FIG. 1, the semiconductor optical integrated device 1 comprises the isolation element portion 2c. The isolation element portion 2c works to electrically isolate the semiconductor modulation element portion 2a from the semiconductor light generation element portion 2b. Accordingly, the contact layer is removed in the isolation element 2c to form an isolation portion 62. The isolation portion 62 prevents the semiconductor modulation element portion 2a from electrically connecting the semiconductor light generation element 2b through the contact layer.

A structure for isolating the elements is not limited to the specific structure shown in the embodiment. In the embodiment, the structure of the optical waveguide of the isolation element 2c is similar to the semiconductor modulation element portion 2a or the semiconductor light generation element portion 2b. However, the present invention is not limited thereto.

The optical waveguide mesa portion 12 abut on the optical waveguide mesa portion 52 at a boundary surface 64. This abutting serves to optically couples the optical waveguide mesa portion 12 and the optical waveguide mesa portion 52 with each other. In this structure, the semiconductor light generation element portion 2b is optically coupled through the isolation element portion 2c to the semiconductor modulation element portion 2a.

FIG. 2A is a sectional view showing the semiconductor modulation element portion 2a. FIG. 2B is a view showing an equivalent electrical circuit of the multilayer semiconductor portion 24. FIG. 3 is a sectional view showing the semiconductor light generation element portion 2b. In the semiconductor modulation element portion 2a and the semiconductor light generation element portion 2b, the multilayer semiconductor portion 24 has first to fourth III-V compound semiconductor layers 36, 38, 40 and 42 sequentially arranged on the substrate 4. Specifically, the first III-V compound semiconductor layer 36 is a p-type semiconductor layer extending along the substrate 4 and the side faces of the optical waveguide mesa portions 12 and 52. The second III-V compound semiconductor layer 38 is an n-type semiconductor layer provided on the first semiconductor layer 36. The third III-V compound semiconductor layer 40 is a p-type semiconductor layer extending along the second semiconductor layer 38. The fourth III-V compound semiconductor layer 42 is an n-type semiconductor layer provided on the third semiconductor layer 40. Each of the first to fourth semiconductor layers 36, 38, 40 and 42 has a conductive type different from that of the adjacent semiconductor regions. Each of the first to fourth semiconductor layers 36, 38, 40 and 42 and the semiconductor regions adjacent thereto is provided to form semiconductor junctions, such as pn-junctions and pin-junctions.

Additionally, any one layer of the first to fourth semiconductor layers 36, 38, 40 and 42 is adjacent to at least one semiconductor region as follows: the remaining layer of the first to fourth semiconductor layers 36, 38, 40 and 42; the n-type semiconductor substrate 4; and the p-type semiconductor layer 20. The first semiconductor layer 36 (for example, p-type semiconductor layer) and the n-type semiconductor substrate 4 form a junction 44a. The second semiconductor layer 38 (for example, n-type semiconductor layer) and the third semiconductor layer 40 form a junction 44b. The fourth semiconductor layer 42 and the p-type semiconductor layer 20 form a junction 44c. The first semiconductor layer 36 (for example, p-type semiconductor layer) and the second semiconductor layer 38 form a junction 44d. The third semiconductor layer 40 (for example, p-type semiconductor layer) and the fourth semiconductor layer 42 form a junction 44e.

Referring to FIG. 2A, in the semiconductor modulation element portion 2a of the semiconductor optical integrated device 1, a reverse voltage is applied to the junctions 44a to 44c to form depletion layers in the junctions. The depletion layers work as capacitors formed in the junctions 44a to 44c in the semiconductor optical integrated device 1 shown in FIGS. 2A and 2B, and these capacitors are placed in series in an electric equivalent circuit. Thus, since the capacitors are connected in series between the electrodes 28 and 32, the combined capacitance of these series capacitors is smaller than the capacitance of each capacitor.

In order to sufficiently thicken a depletion region in the p-type and n-type semiconductor layers forming a junction, it is preferable that the impurity concentration of one semiconductor layer of these semiconductor layers is smaller than that of the other semiconductor layer.

The semiconductor light generation element portion 2b will be described with reference to FIG. 3. The first semiconductor layer 36 (for example, p-type semiconductor layer) is provided on the semiconductor substrate 4 (for example, n-type semiconductor substrate) and the side face of the semiconductor mesa portion 52. Since the first semiconductor layer 36 is in contact with the p-type semiconductor layer (reference numeral 50 shown in FIG. 1) in the semiconductor mesa portion 52, leakage current $I_1$, flows through the p-type semiconductor layer 50 and the p-type semiconductor layer 36 to the n-type semiconductor substrate 4 in the semiconductor light generation element portion 2b. One way to reduce the leakage current $I_1$, is to form the first semiconductor layer 36 of the resistance that is greater than that of the semiconductor substrate 4. In order to increase the resistance of the p-type semiconductor layer 36, it is preferable that the impurity concentration of the p-type semiconductor layer 36 be smaller than that of the adjacent semiconductor region 4. According to the experimental studies by the inventors, it is preferable that the carrier concentration of the p-type semiconductor layer 36 be equal to or lower than $5 \times 10^{17}$ atoms per unit volume $(cm^{-3})$.

Furthermore, a parasitic thyristor is formed in the multilayer semiconductor portion 24 of the semiconductor light generation element 2b. The parasitic thyristor is constituted of the n-type semiconductor substrate 4, the p-type semiconductor layer 36, the n-type semiconductor layer 38 and the p-type semiconductor layer 40. One way In order to reduce thyristor current $I_2$ flowing in the parasitic thyristor, it is preferable that the carrier concentration of the p-type semiconductor layer 36 be relatively smaller and/or the thickness of the p-type semiconductor layer 36 be relatively larger. According to the experimental studies by the inventors, it is preferable that the carrier concentration of the p-type semiconductor layer 36 be equal to or lower than $5 \times 10^{17}$ cm$^{-3}$ and that the thickness of the p-type semiconductor layer 36 is equal to or higher than 0.1 micrometers. Additionally, in order to reduce the current $I_2$ flowing in the parasitic thyristor, it is preferable that the carrier concentration of the n-type semiconductor layer 38 be relatively larger, i.e., equal to or higher than $1 \times 10^{18}$ atoms per unit volume $(cm^{-3})$ (Second Embodiment)

Figure 4:
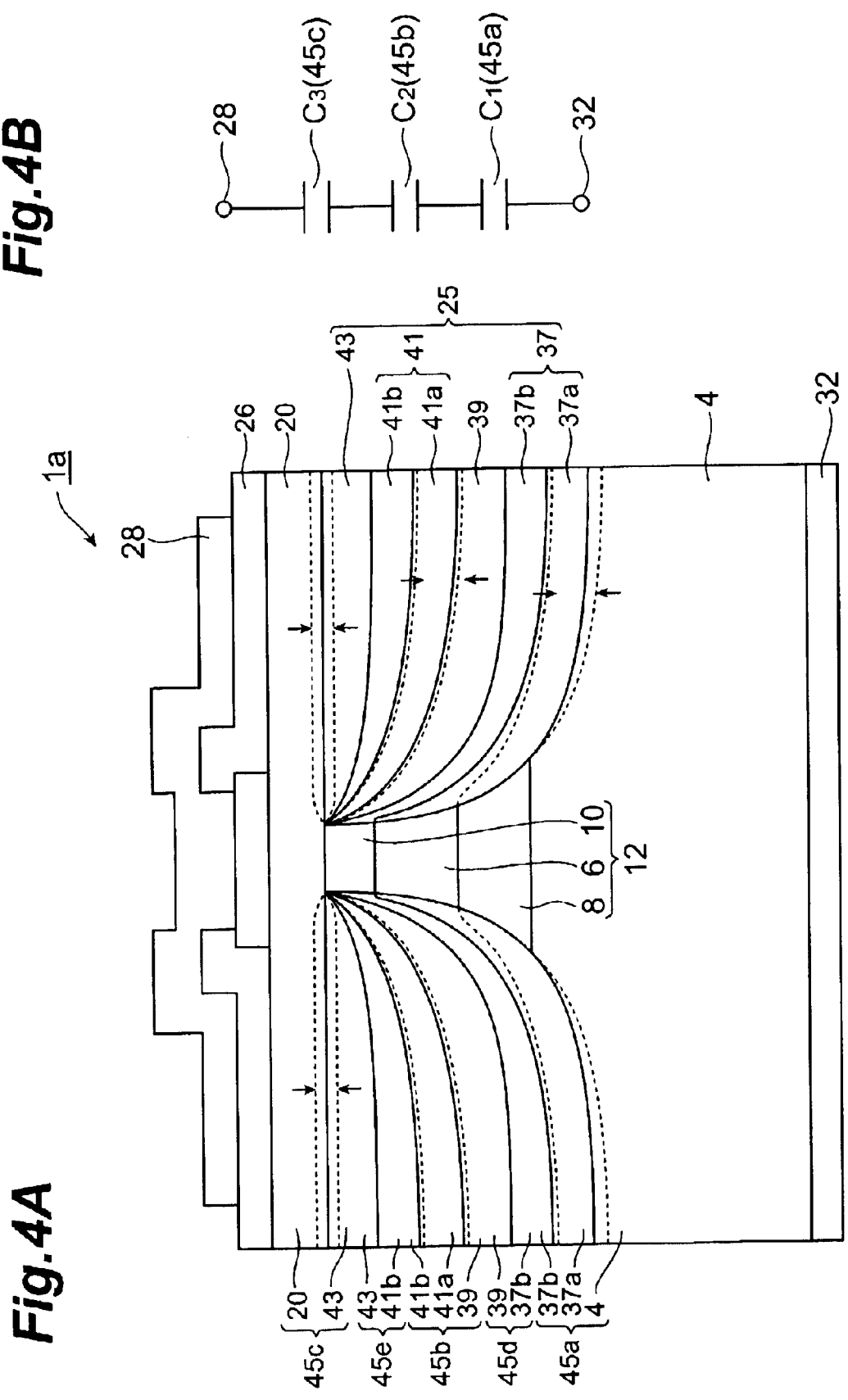
FIG. 4A is a sectional view showing a structure of a multilayer semiconductor portion of a semiconductor optical integrated device according to another embodiment.
FIG. 4B shows an equivalent circuit of the multilayer semiconductor portion.

FIG. 4A is a sectional view showing a structure of a multilayer semiconductor portion of a semiconductor optical integrated device according to another embodiment. FIG. 4B shows an equivalent circuit of the multilayer semiconductor portion. The semiconductor optical integrated device 1a comprises a multi-layer semiconductor portion 25 in place of the multilayer semiconductor portion 24 of the semiconductor optical integrated device 1. The multilayer semiconductor portion 25 has first to fourth III-V compound semiconductor layers 37, 39, 41 and 43 sequentially arranged on the substrate 4. For example, the first III-V compound semiconductor layer 37 may be a p-type semiconductor layer extending along the substrate 4 and the side faces of an optical waveguide mesa portion 12. The second III-V compound semiconductor layer 39 may be an n-type semiconductor layer provided on the first semiconductor layer 37. The third III-V compound semiconductor layer 41 maybe a p-type semiconductor layer extending along the second semiconductor layer 39. The fourth III-V group compound semiconductor layer 43 may be an n-type semiconductor layer provided on the third semiconductor layer 41. Each of the first to fourth semiconductor layers 37, 39, 41 and 43 has a conductive type different from that of the adjacent semiconductor layers and regions, and each of the first to fourth semiconductor layers 37, 39, 41 and 43 and the semiconductor layers and regions adjacent thereto are provided to form semiconductor junctions, such as a pn junction or a pin junction.

In FIG. 4A, the semiconductor layer 37 includes first and second layered semiconductor regions 37a and 37b. The first layered semiconductor region 37a is provided between the semiconductor substrate 4 and the second layered semiconductor area 37b. The semiconductor substrate 4 has a conductive type different from that of the semiconductor region 37a and has an impurity concentration higher than that of the semiconductor area 37a. Since the impurity concentration of the first layered semiconductor region 37a is lower than that of the second layered semiconductor region 37b, a depletion layer is produced in the layered semiconductor area 37a rather than in the layered semiconductor area 37b and the semiconductor substrate 4 in the semiconductor modulation element portion.

Any one of the first to fourth semiconductor layers 37, 39, 41 and 43 is adjacent to semiconductor regions of the n-type semiconductor substrate 4, a p-type semiconductor layer 20, and the remaining of the first to fourth semiconductor layers 37, 39, 41 and 43. A junction device 45a is constituted of the first semiconductor layer 37 (p-type layered semiconductor region 37a and p$^+$-type layered semiconductor region 37b) and the n-type semiconductor substrate 4. A junction device 45b is constituted of the second semiconductor layer 39 (n-type semiconductor layer) and the third semiconductor layer 41. A junction device 45c is constituted of the fourth semiconductor layer 43 and the p-type semiconductor layer 20. A junction device 45d is constituted of the first semiconductor layer 37 (p-type semiconductor layer) and the second semiconductor layer 39. A junction device 45e is constituted of the third semiconductor layer 41 (p-type semiconductor layer) and the fourth semiconductor layer 43.

In the semiconductor modulation element portion of the semiconductor optical integrated device 1b, reverse voltages are applied to the junction devices 45a to 45c, and depletion layers are formed in these junction devices. In the electric equivalent circuit of the semiconductor optical integrated device 1b as shown in FIG. 4A, depletion layer capacitors are formed for each of the junction devices 45a to 45c, and connected in series between electrodes 28 and 32. The combined capacitance of these series capacitors is smaller than the capacitance of each capacitor.

For example, the respective semiconductor layers has impurity concentrations in atoms per unit volume ($cm^{-3}$) as follows:

n-type semiconductor substrate 4:
  $1.0 \times 10^{18}$ ($cm^{-3}$)
p-type semiconductor layer 37a:
  0.5 micrometers ($\mu$m), $1.0 \times 10^{17}$ ($cm^{-3}$);
p-type semiconductor layer 37b:
  0.5 micrometers ($\mu$m), $1.0 \times 10^{18}$ ($cm^{-3}$);
n-type semiconductor layer 39:
  0.2 micrometers ($\mu$m), $1.0 \times 10^{18}$ ($cm^{-3}$);
p-type semiconductor layer 41a:
  0.5 micrometers ($\mu$m), $1.0 \times 10^{17}$ ($cm^{-3}$);
p-type semiconductor layer 41b:
  0.5 micrometers ($\mu$m), $1.0 \times 10^{18}$ ($cm^{-3}$);
n-type semiconductor layer 43:
  0.5 micrometers ($\mu$m), $1.0 \times 10^{18}$ ($cm^{-3}$); and
p-type semiconductor layer 20:
  $1.0 \times 10^{18}$ ($cm^{-3}$).

FIG. 4B is a view showing an equivalent circuit of depletion layer capacitances $C_1$, $C_2$ and $C_3$. In this specific examples, since the capacitance $C_3$ is sufficiently larger than the capacitances $C_1$, and $C_2$, combined capacitance C is approximately equal to the combined capacitance of the capacitances $C_1$, and $C_2$. If $C_1=C_2=1.2$ picofarads (pF), then C=0.6 picofarads.

In the semiconductor light generation element shown in FIGS. 4A and 4B, since the first semiconductor layer 37 is in contact with the p-type semiconductor layer (reference numeral 50 shown in FIG. 1) in the semiconductor mesa portion 12, leakage current flows through the p-type semiconductor layer 50 and the p-type semiconductor layer 37 to the n-type semiconductor substrate 4. However, a layered region 37a having a low impurity concentration works to reduce this leakage current. That is, the impurity concentration of the first semiconductor layer 37 is smaller than that of the semiconductor substrate 4 to increase the resistance of the p-type semiconductor layer 37. According to the inventors' experimental studies, it is preferable that the carrier concentration of the p-type semiconductor layer 37a be equal to or lower than $5 \times 10^{17}$ atoms per unit volume ($cm^{-3}$).

Furthermore, a parasitic thyristor is formed in the multilayer semiconductor portion 25 of the semiconductor light generation element shown in FIG. 4A. The parasitic thyristor is constituted of the n-type semiconductor substrate 4, the p-type semiconductor layer 37, the n-type semiconductor layer 38 and the p-type semiconductor layer 41. Once the parasitic thyristor is turned on, thyristor current continues to flow in the parasitic thyristor. In order to reduce the thyristor current, it is preferable that the carrier concentration of the p-type semiconductor layer 37a be relatively smaller, and it is also preferable that the thickness of the p-type semiconductor layer 37 be relatively larger. According to the inventors' experimental studies, it is preferable that the carrier concentration of the p-type semiconductor layer 37a be $5 \times 10^{17}$ $cm^{-3}$ or less, and the thickness of the p-type semiconductor layer 37 be 0.1 micrometers or more. In order to reduce the current flowing in the parasitic thyristor, it is preferable that the carrier concentration of the n-type semiconductor layer 39 is relatively larger, i.e., the concentration is $1 \times 10^{18}$ atoms per unit volume ($cm^{-3}$) or more.

As shown in FIG. 4A, the semiconductor layer 41 may include first and second layered semiconductor regions 41a and 41b. The first layered semiconductor area 41a is provided between the n-type semiconductor layer 39 and the second layered semiconductor area 41b. The conductive type of the n-type semiconductor layer 39 is different from that of the semiconductor region 41a, and the impurity concentration of the n-type semiconductor layer 39 is higher than that of the semiconductor region 41a. Since the impurity concentration of the first layered semiconductor region 41a is lower than that of the second layered semiconductor region 41b in the semiconductor modulation element portion, a depletion layer is formed in the layered semiconductor region 41a rather than the layered semiconductor region 41b and the n-type semiconductor layer 39.

(Third Embodiment)

Figure 5:
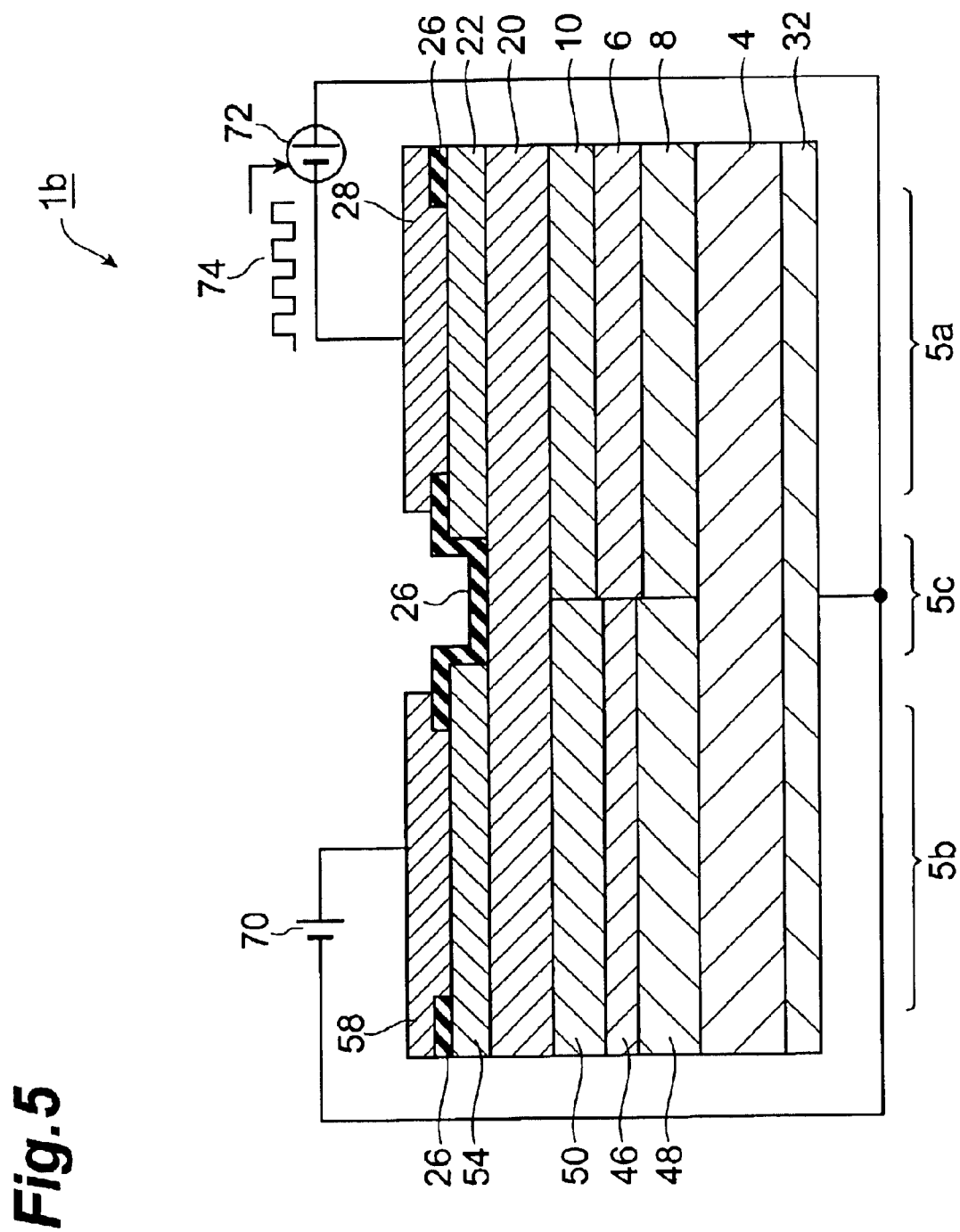
FIG. 5 is a view showing an embodiment of a semiconductor optical integrated device.

FIG. 5 shows an embodiment of a semiconductor optical integrated device. The semiconductor optical integrated device 1b includes an electroabsorption (EA) modulation element portion 5a, Fabry-Perot semiconductor laser element portion 5b, and an isolation element portion 5c. The EA modulation element portion 5a is optically coupled to the Fabry-Perot semiconductor laser element portion 5b through the isolation element portion 5c.

The EA modulation element portion 5a is inversely biased by a power supply 72. The power supply 72 is connected to electrodes 28 and 32 of the electroabsorption modulation element 5a to supply a driving signal in response to an electric signal 74 to the electroabsorption modulation element 5a. In the electroabsorption modulation element portion 5b, combined capacitance between the electrodes 28 and an electrode 32 is reduced. Accordingly, the electroabsorption modulation element 5a can operate in response to a higher-speed driving signal.

On the other hand, the Fabry-Perot semiconductor laser element portion 5a is forwardly biased by a power supply 70. The power supply 70 is connected to the electrodes 58 and 32 of the Fabry-Perot semiconductor laser element 5a to supply unmodulated current to the Fabry-Perot semiconductor laser element portion 5a. Thus, the semiconductor optical integrated device 1b has its structure capable of reducing a waste of current such as leakage current and thyristor current, and operates to generate an optical signal modulated by a higher-speed signal.

(Fourth Embodiment)

Figure 6:
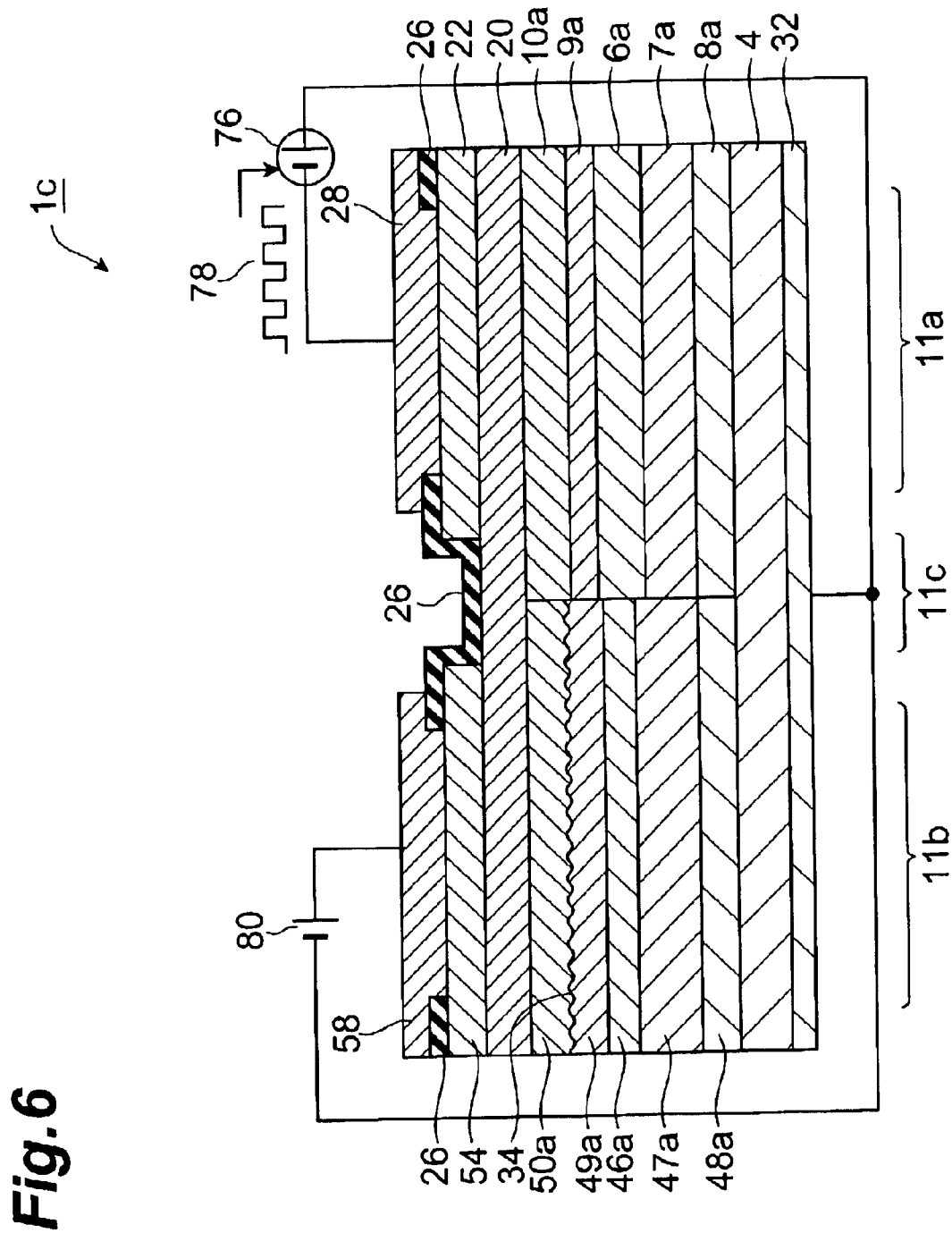
FIG. 6 is a view showing another embodiment of a semiconductor optical integrated device.

FIG. 6 shows still another embodiment of a semiconductor optical integrated device. The semiconductor optical integrated device 1c includes an EA modulation element portion 11a, a DFB semiconductor laser element portion 11b, and an isolation element portion 11c. The electroabsorption modulation element portion 11a is optically coupled to the DFB semiconductor laser element portion 11b through the isolation element portion 11c. In the EA modulation element portion 11a, an n-type semiconductor layer 7a such as an n-type optical guide layer is provided between an active layer 6a and an n-type semiconductor layer 8a. A p-type semiconductor layer 9a, such as a p-type optical guide layer, is provided between the active layer 6a and a p-type semiconductor layer 10a. Since the refractive indexes of the active layer 6a, the n-type semiconductor layer 7a and the p-type semiconductor layer 9a are larger than those of the n-type semiconductor layer 8a and the p-type semiconductor layer 10a, the semiconductor layers 6a to 10a constitute an optical waveguide.

In the DFB semiconductor laser element portion 11b, an n-type semiconductor layer 47a such as an n-type optical guide layer is provided between an active layer 46a and an n-type semiconductor layer 48a. A p-type semiconductor layer 49a, such as a p-type optical guide layer, is provided between the active layer 46a and a p-type semiconductor layer 50a. Since refractive indexes of the active layer 46a, the n-type semiconductor layer 47a and the p-type semiconductor layer 49a are larger than those of the n-type semiconductor layer 48a and the p-type semiconductor layer 50a, these semiconductor layers 46a, 48a and 50a constitute an optical waveguide. The n-type semiconductor layer 47a and the p-type semiconductor layer 49a serve to confine a carrier in the active layer 46a.

The semiconductor layers are sequentially provided on the n-type semiconductor substrate 4. The semiconductor light generation element portion 11a comprises a grating 34 provided in a boundary between the semiconductor layer 49a and the semiconductor layer 50a. The grating 34 is constituted by the periodic structure of the boundary surface between the semiconductor layer 49c and the semiconductor layer 50a. The grating 34 is provided to be optically coupled to the active layer 6a. This structure is suitable for a semiconductor light generation element portion working as a distributed feedback semiconductor laser.

The electroabsorption modulation element portion 11a is inversely biased by a power supply 76. The power supply 76 is connected to electrodes 28 and 32 of the electroabsorption modulation element portion 11a to supply a driving signal in response to an electric signal 78 to the electroabsorption modulation element 11a. In the electroabsorption modulation element portion, combined capacitance between the electrode 28 and an electrode 32 is reduced. Accordingly, the electroabsorption modulation element portion 11a can operate in response to a higher-speed driving signal.

On the other hand, the DFB semiconductor laser element portion 11b is forwardly biased by a power supply 80. The power supply 80 is connected to the electrodes 28 and 32 of the DFB semiconductor laser element portion 11b to supply unmodulated constant current to the DFB semiconductor laser element 11b. Thus, the semiconductor optical integrated device 1c can reduce a waste of electric current, such as leakage current and thyristor current, and can generate an optical signal modulated by a higher-speed signal.

(Fifth Embodiment)

Figure 7:
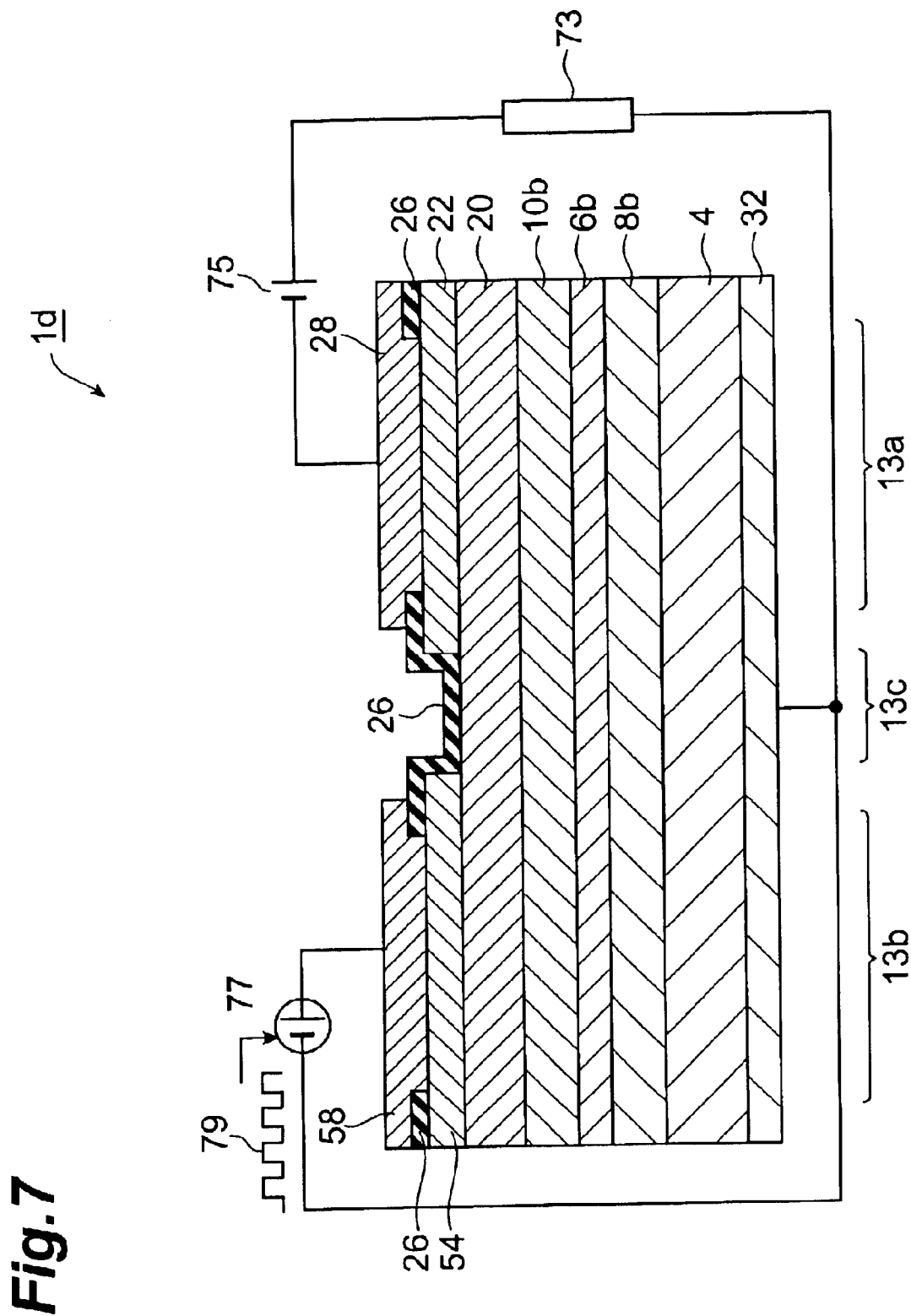
FIG. 7 is a view showing still another embodiment of a semiconductor optical integrated device.

FIG. 7 shows an embodiment of a semiconductor optical integrated device. The semiconductor optical integrated device 1d includes a waveguide type photodetector 13a, a semiconductor laser element 13b, and an isolation element 13c. The waveguide type photodetector 13a, such as a waveguide photodiode, is optically coupled to the semiconductor laser element 13b through the isolation element 13c.

The waveguide photodetector portion 13a, the semiconductor laser element portion 13b and the isolation element portion 13c have a common structure, which includes a semiconductor layer 6b, an n-type semiconductor layer 8b and a p-type semiconductor layer 10b, and these layers are provided on a substrate 4. However, the semiconductor optical integrated device 1d is not limited to this structure. In the waveguide photodetector 13a, the semiconductor layer 6b works as an optical absorption region. In the semiconductor laser element portion 13b, the semiconductor layer 6b works as a photo generating region.

The waveguide photodetector 13a is inversely biased by a power supply 75. The waveguide photodetector 13a generates electric current, and this electric current flows to a load 73. A power supply 84 is connected to electrodes 28 and 32 of the waveguide photodetector 13a, and is used to form a depletion layer in the optical absorption region. In the waveguide photodetector 13a, combined capacitance between the electrode 28 and an electrode 32 is reduced. Accordingly, the waveguide type photodetector 13a can operate in response to a higher-speed optical signal.

On the other hand, the semiconductor laser element 13b is forwardly biased by a power supply 77. The power supply 77 is connected to the electrodes 58 and 32 of the semiconductor laser element 13b to supply modulated current 79 to the semiconductor laser element 13b. Thus, the semiconductor optical integrated device 1d can reduce a waste of electric current, such as leaked current and thyristor current, and generate an optical signal modulated by a higher-speed signal. For example, the semiconductor laser element 13b generates light in 1.55 micrometer wavelength band and the photodetector 13a generates a photo current in response to light in 1.33 micrometer wavelength band In each of the embodiments shown in FIGS. 5 to 7, the semiconductor optical integrated device comprises a first portion provided to constitute any one of the semiconductor photodetector and the optical modulator, and a second portion provided to constitute any one of the DFB semiconductor laser element and the Fabry-Perot semiconductor laser element. As shown in FIG. 4A, the semiconductor layer 37 can include the first and second layered semiconductor regions 37a and 37b in the semiconductor optical integrated device.

(Sixth Embodiment)

Another embodiment is directed to a method for manufacturing a semiconductor optical integrated device. Now, description will be made of a method for manufacturing a semiconductor optical integrated device with reference to FIGS. 8A to 8C, FIGS. 9A to 9C and FIG. 10.

(Forming Semiconductor Multilayer Film)

Figure 8A:
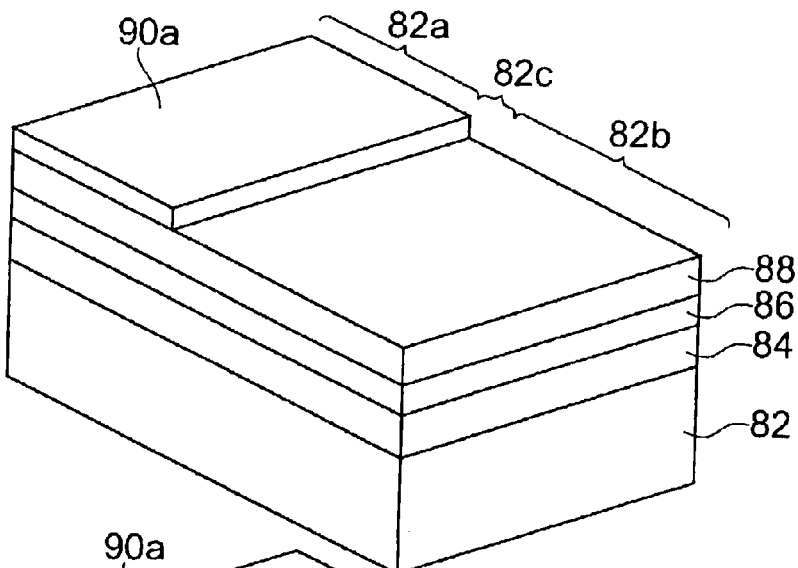
FIGS. 8A to 8C are sectional views showing a method for manufacturing a semiconductor optical integrated device.

Referring to FIG. 8A, a substrate 82 includes a light generation element region 82a, a modulation element region 82b, and an isolation element region 82c. These regions 82a to 82c are arranged in a direction of a predetermined axis. On the substrate 82, an n-type InP semiconductor film 84, a semiconductor active layer film 86 and a p-type InP semiconductor film 88 are epitaxially grown in sequence. These films are deposited by, for example, an organic metal vapor phase epitaxial (OMVPE) method to form a semiconductor multiplayer portion.

Figure 8B:
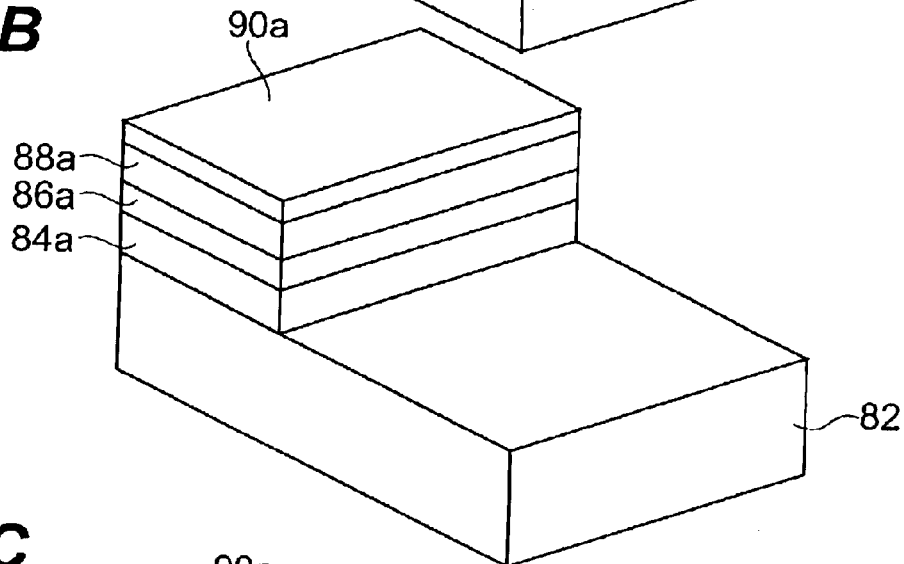

Then, as shown in FIG. 8B, a mask 90a (e.g., insulating silicon inorganic insulating film mask) is formed to cover the light generation element region 82a. After the formation of the mask 90a, the semiconductor multilayer portion is removed from the modulation element region 82b and the isolation element region 82c by etching by use of the mask 90a. After this removal, another semiconductor multilayer portion is formed on the light generation element region 82a, and includes an n-type InP semiconductor film 84a, an active layer film 86a and a p-type InP semiconductor film 88a.

Figure 8C:
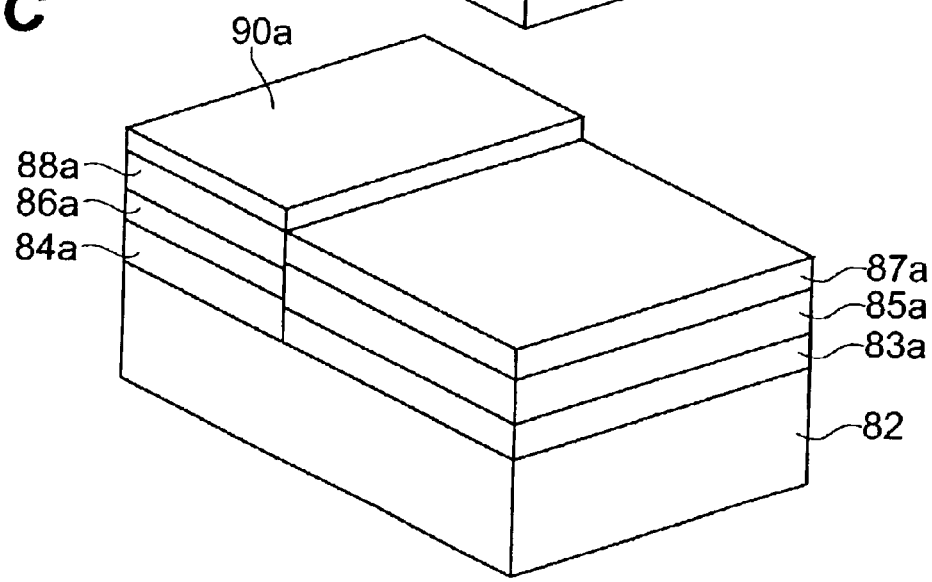

Referring to FIG. 8C, an n-type InP semiconductor film 83a, a semiconductor active layer film 85a and a p-type InP semiconductor film 87a are epitaxially grown in sequence on the modulation element region 82b and the isolation element region 82c. These films maybe deposited by, for example, the OMVPE method. This multilayer portion is selectively deposited by use of the mask 90a and is formed on the modulation element region 82b and the isolation element region 82c. After the formation, the mask 90a is removed.

(Forming Optical Waveguide Mesa)

Figure 9A:
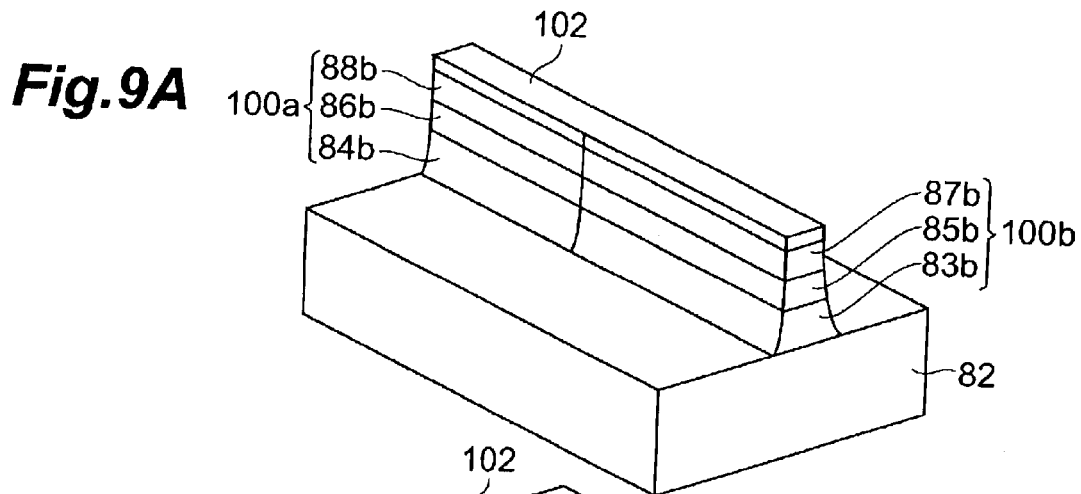
FIGS. 9A to 9C are sectional views showing a method for manufacturing a semiconductor optical integrated device.

Referring to FIG. 9A, optical waveguide mesa portions 100a and 100b are formed. Prior to forming the optical waveguide mesa portions 100a and 100b, a waveguide mask 102 is formed. The mask 102 is, for example, an insulating silicon inorganic compound film mask. The semiconductor multilayer portion is etched by use of this mask 102 to form the optical waveguide mesa portions 100a and 100b in the light generation element region 82a, the modulation element region 82b and the isolation element region 82c. In a preferred embodiment, this etching is carried out by wet etching. Etchant can be bromine methanol. The multiplayer portion is etched until the n-type InP semiconductor film 84a, the active layer film 86a, the p-type InP semiconductor film 88a, the n-type InP semiconductor film 83a, the semiconductor active layer film 85a, and the p-type InP semiconductor film 87a are removed to expose the substrate 82. As a result of the etching, the optical waveguide mesa portion 100a and the optical waveguide mesa portion 100b are formed. The optical waveguide mesa portion 100a comprises an n-type InP semiconductor layer (n-type clad layer) 84b, an active layer 86b, and a p-type InP semiconductor layer (p-type clad layer) 88b. The optical waveguide mesa portion 100b comprises an n-type InP semiconductor layer (n-type clad layer) 83b, an active layer 85b, and a p-type InP semiconductor layer (p-type clad layer) 87b.

(Forming Current Blocking Semiconductor Film)

Figure 9B:
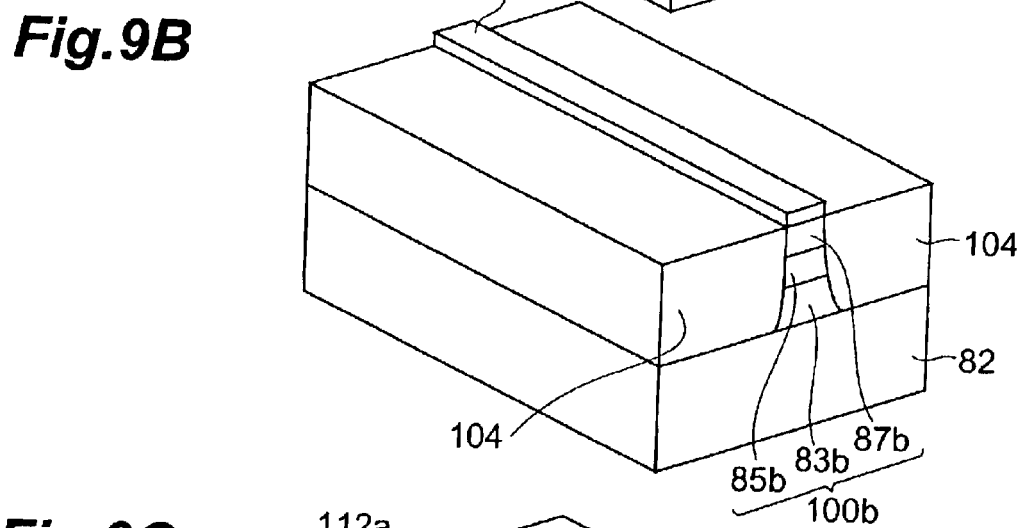

Referring to FIG. 9B, in order to bury the optical waveguide mesa portions 100a and 100b, a plurality of InP semiconductor films are grown to form a semiconductor portion 104. The semiconductor portion 104 is selectively deposited by use of the mask 102, and is formed on the light generation element region 82a, the modulation element region 82b and the isolation element region 82c. In a preferred embodiment, the semiconductor portion 104 is formed in an organic metal chemical vapor deposition (OMCVD) method. The mask 102 is removed after forming the semiconductor portion 104. The semiconductor portion 104 is constituted by a number of InP semiconductor layers, for example four layers, and is formed on a side face of the optical waveguide mesa portion 100a and a side face of the optical waveguide mesa portion 100b. The multilayer semiconductor portion 104 is similar to the semiconductor portion 24 as shown in FIGS. 2A to 4B. The semiconductor portion 104 is formed to guide electric current to the optical waveguide mesa portion 100a in the light generation element portion.

(Forming Contact Semiconductor Film)

Figure 9C:
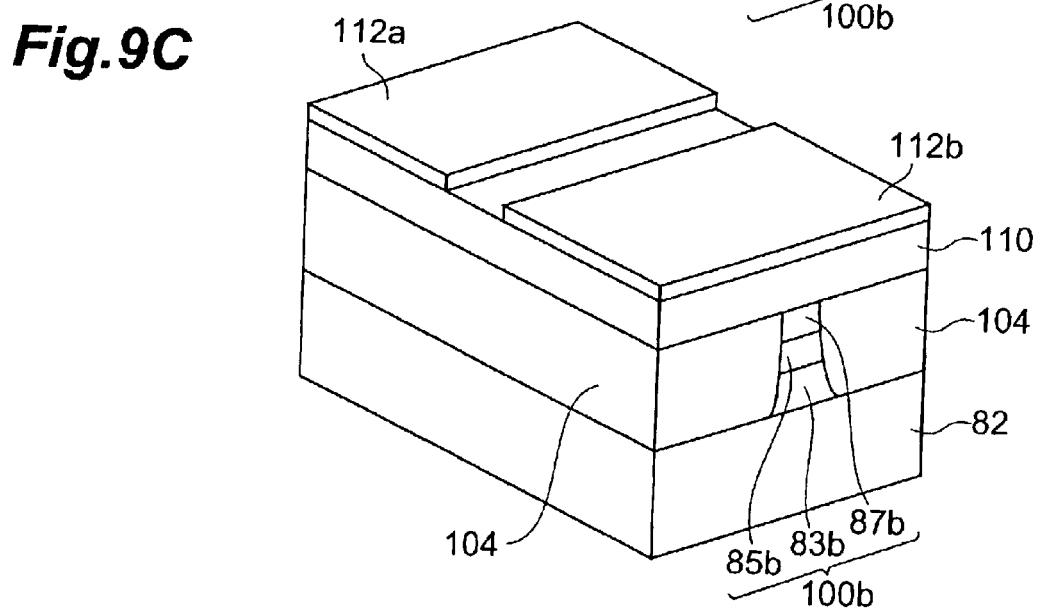

Referring to FIG. 9C, a p-type InP semiconductor film 110 and a p-type GaInAs semiconductor film 112 are formed on the optical waveguide mesa portions 100a and 100b and the semiconductor portion 104. The p-type InP semiconductor film 110 is formed on the optical waveguide mesa portions 100a and 100b to cover a boundary therebetween. A p-type GaInAs semiconductor layer 112a is formed on the p-type InP semiconductor film 110 in the light generation element region 82a. A p-type GaInAs semiconductor film 112b is formed on the p-type InP semiconductor film 110 provided in the modulation element region 82b. The p-type GaInAs semiconductor layers 112a and 112b serve as contact layers for the light generation element region 82a and the modulation element region 82b, respectively. No contact layer is formed on the isolation element area 82c.

(Trench Formation)

Figure 10:
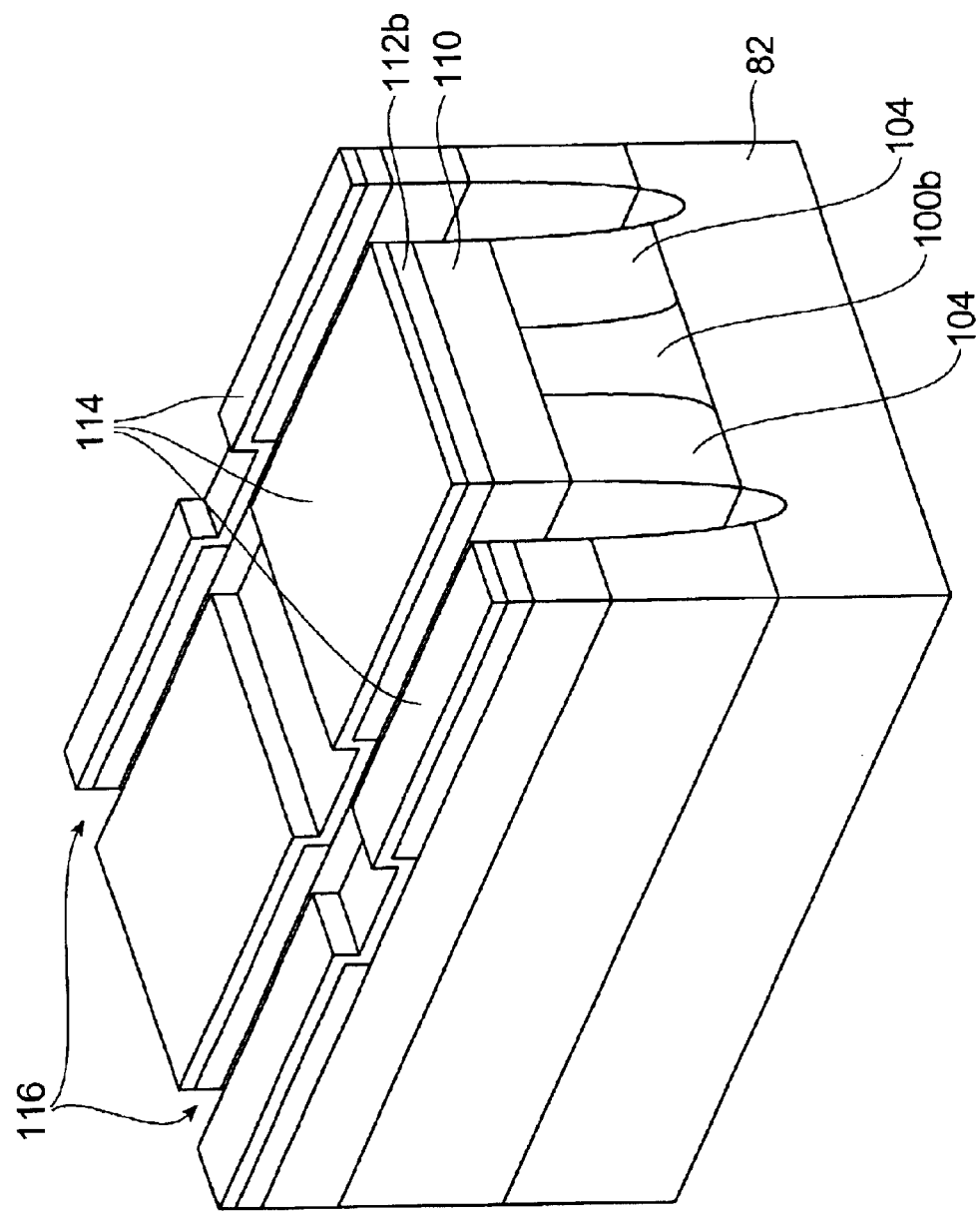
FIG. 10 is a sectional view showing a method for manufacturing a semiconductor optical integrated device.

Referring to FIG. 10, a mask 114 for forming trenches is formed on the p-type InP semiconductor film 110 and the p-type GaInAs semiconductor films 112a and 112b. The trench mask 114 has a pattern extending in a predetermined direction.

The semiconductor portion 104, the p-type InP semiconductor film 110, and the p-type GaInAs semiconductor films 112a and 112b are etched out by use of the trench mask 114. The etching is carried out so as to form trenches extending to the substrate 82 in the semiconductor portion 104, the p-type InP semiconductor film 110 and the p-type GaInAs semiconductor films 112a and 112b. As shown in FIG. 10, a pair of trenches 116 are formed for each device after the etching. After forming these trenches 116, the trench mask 114 is removed.

The optical waveguide is located between the trenches 116. Each trench 116 is formed to remove the part of the semiconductor portion 104, thereby reducing parasitic capacitance in the semiconductor portion 104.

(Formation Process of Ohmic Electrode)

Figure 11:
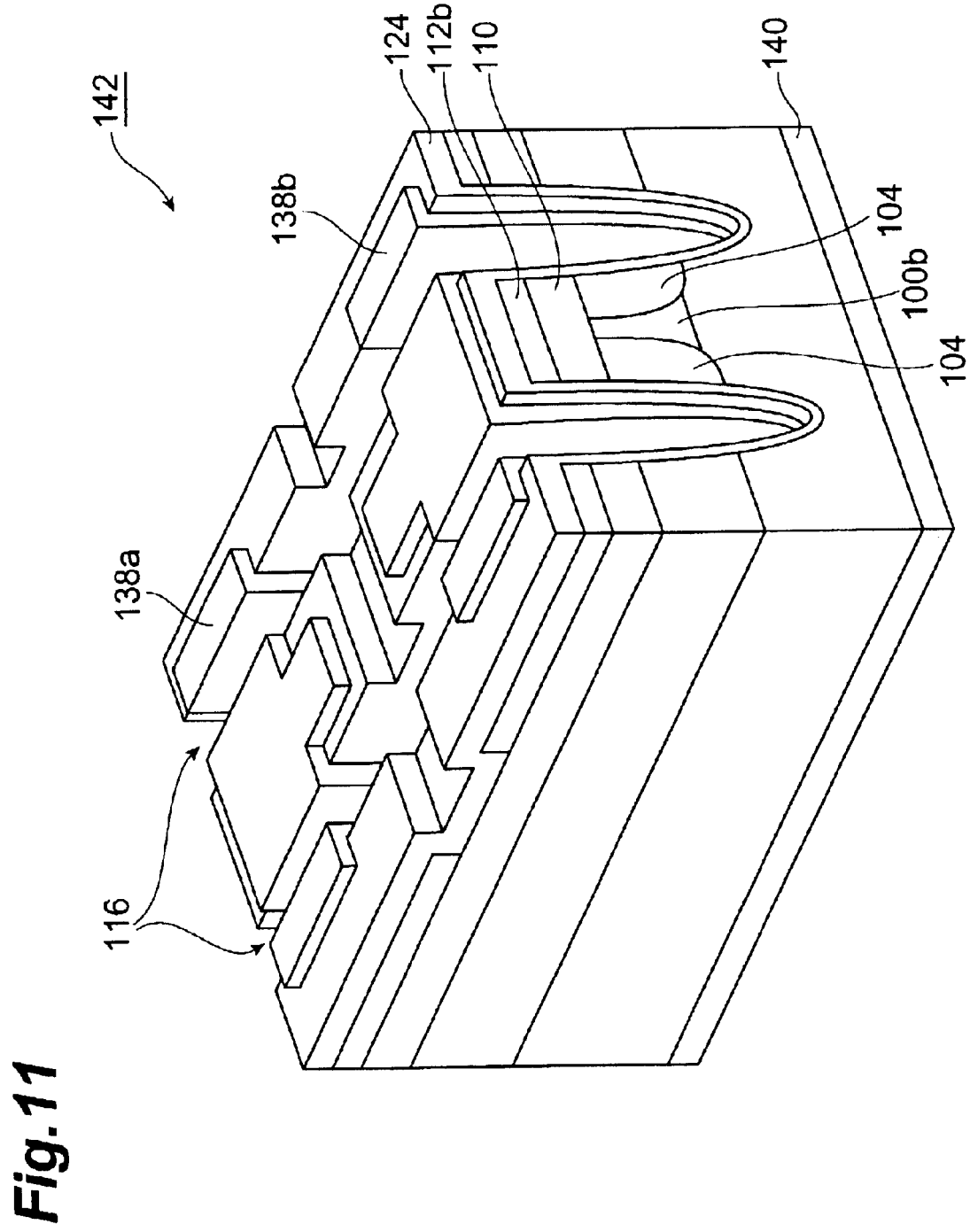
FIG. 11 is a sectional view showing a method for manufacturing a semiconductor optical integrated device.

The process of forming an ohmic electrode will be described with reference to FIG. 11. After forming the contact layers 112a and 112b, an insulating silicon inorganic compound film 124 is formed thereon. Then, openings are formed in the insulating film 124 both on the contact layer 112a of the light generation element region 82a and the contact layer 112b of the modulation element region 82b. These openings are used as contact holes to the contact layers of the respective element portions.

After forming the contact holes, a positive photoresist mask is formed. This positive photoresist mask has a pattern for forming an electrode. After depositing a metal film thereon, the positive resist mask is lifted off by solvent to form p-ohmic electrodes 138a and 138b. On the backside of the substrate 82, an n-ohmic electrode 140 is formed on its whole surface. After the manufacturing processes as described above, a semiconductor optical integrated device 142, such as the one shown in FIG. 11, is completed.

As described above, according to the present invention, provided is the semiconductor optical device having the structure capable of reducing capacitance.

Having been illustrated and described the principle of the present invention in the preferred embodiments, it is apparent to a person skilled in the art that the present invention can be modified in arrangements and details without departing from such principles. For example, the semiconductor optical devices in the foregoing embodiments are formed of specific semiconductor material, but the material can be changed as required. Moreover, although the embodiments describe the semiconductor optical device comprising the multilayer semiconductor portion including four semiconductor layers, the number of semiconductor layers is not limited to four. The multilayer semiconductor portion may include four or more semiconductor layers We therefore claim all modifications and variations coming within the spirit and scope of the following claims.

What is claimed is:

1. A semiconductor optical device comprising:
   a semiconductor substrate of a first conductive type;
   a semiconductor portion including first and second III-V compound semiconductor layers and an active layer, the semiconductor portion being provided on the semiconductor substrate, and the semiconductor portion having a side face extending in a direction of a predetermined axis, the active layer being provided between the first and second III-V compound semiconductor layers;
   a multilayer semiconductor portion provided on the semiconductor substrate and the side face of the semiconductor portion; and
   a second conductive type semiconductor layer provided on the semiconductor portion and the multilayer semiconductor portion;
   wherein the multilayer semiconductor portion has first to fourth semiconductor layers arranged on the semiconductor substrate, wherein the first semiconductor layer is a second conductive type III-V compound semiconductor layer provided on the semiconductor substrate and the side face of the semiconductor portion, wherein the second semiconductor layer is a first conductive type III-V compound semiconductor layer provided on the first semiconductor layer, wherein the third semiconductor layer is a second conductive type III-V compound semiconductor layer provided on the second semiconductor layer, wherein the fourth semiconductor layer is a first conductive type III-V compound semiconductor layer provided on the third semiconductor layer, and wherein each semiconductor layer of the first to fourth semiconductor layers and a semiconductor region adjacent to the semiconductor layer constitutes one of a pn junction and a pin junction.

2. The semiconductor optical device according to claim 1, further comprising:

a first electrode electrically connected to the first III-V compound semiconductor layer of the semiconductor portion; and a second electrode electrically connected to the second III-V compound semiconductor layer of the semiconductor portion.

3. The semiconductor optical device according to claim 1, wherein the first semiconductor layer of the multiplayer semiconductor portion includes first and second layered semiconductor regions, wherein an impurity concentration of the first layered semiconductor region is lower than that of the second layered semiconductor region, and wherein the first layered semiconductor region is provided between the second layered semiconductor region and the substrate, and wherein the impurity concentration of the first layered semiconductor region is lower than that of the substrate.

4. The semiconductor optical device according to claim 1, further comprising a pair of trenches provided in the first to fourth semiconductor layers of the multilayer semiconductor portion, wherein the semiconductor portion is located between the trenches.

5. The semiconductor optical device according to claim 1, wherein the active layer includes a light generating region provided for a semiconductor light generation element.

6. The semiconductor optical device according to claim 1, wherein the active layer includes an optical absorption region provided for an optical modulator.

7. The semiconductor optical device according to claim 1, wherein the active layer includes an optical absorption region provided for a semiconductor photodetector.

8. The semiconductor optical device according to claim 1, wherein the semiconductor portion includes a first portion provided to constitute one of an optical modulator and a semiconductor photodetector, and a second portion provided to constitute a semiconductor light generation element, and wherein an impurity concentration of the first semiconductor layer has a highest value smaller than that of the second semiconductor layer.

9. The semiconductor optical device according to claim 1, wherein the semiconductor portion includes a first portion provided to constitute one of an optical modulator and a semiconductor photodetector, and a second portion provided to constitute a semiconductor light generation element, wherein an impurity concentration of the first semiconductor layer has a highest value smaller than that of the semiconductor substrate, and wherein an impurity concentration of the second semiconductor layer is larger than the highest value of the impurity concentration of the first semiconductor layer.

10. The semiconductor optical device according to claim 1, wherein the semiconductor portion includes a first portion provided to constitute one of an optical modulator and a semiconductor photodetector, and a second portion provided to constitute a semiconductor light generation element, wherein the first semiconductor layer of the multilayer semiconductor portion includes first and second layered semiconductor regions, wherein an impurity concentration of the first layered semiconductor region is lower than that of the second layered semiconductor region, and wherein the first layered semiconductor region is provided between the semiconductor substrate and the second layered semiconductor region.

11. A semiconductor optical device comprising:

a first conductive type III-V compound semiconductor portion extending along a first reference plane intersecting a predetermined axis;

a second conductive type III-V compound semiconductor portion extending along a second reference plane intersecting the predetermined axis;

a semiconductor portion having side faces, the semiconductor portion being provided between the first conductive type III-V compound semiconductor portion and the second conductive type III-V compound semiconductor portion, the semiconductor portion including first and second III-V compound semiconductor layers and an active layer, the active layer being provided between the first and second III-V group compound semiconductor layers; and a multilayer semiconductor portion having first to fourth semiconductor layers, the first to fourth semiconductor layers being provided between the first conductive type semiconductor portion and the second conductive type semiconductor portion, the multilayer semiconductor portion being provided on the side faces of the semiconductor portion;

wherein each layer of the first to fourth semiconductor layers is adjacent to at least one semiconductor region of the following: the remaining of the semiconductor layers of the first to fourth semiconductor layers; the first conductive type III-V compound semiconductor potion; and the second conductive type III-V compound semiconductor portion, and wherein each of the first to fourth semiconductor layers has a conductive type different from that of the adjacent semiconductor region.

12. The semiconductor optical device according to claim 11, further comprising:

a first electrode electrically connected to the first III-V compound semiconductor layer of the semiconductor portion; and a second electrode electrically connected to the second III-V compound semiconductor layer of the semiconductor portion.

13. The semiconductor optical device according to claim 11,
wherein the first semiconductor layer includes first and second layered semiconductor regions,
wherein an impurity concentration of the first layered semiconductor region is lower than that of the second layered semiconductor region, and
wherein the first layered semiconductor region is provided between the second layered semiconductor region and the substrate, and
wherein the impurity concentration of the first layered semiconductor region is lower than that of the substrate.

14. The semiconductor optical device according to claim 11, further comprising a pair of trenches provided in the first to fourth semiconductor layers of the multilayer semiconductor portion, and
wherein the semiconductor portion is located between the trenches.

15. The semiconductor optical device according to claim 11, wherein the active layer includes a light generating region provided for a semiconductor light generation element.

16. The semiconductor optical device according to claim 11, wherein the active layer includes an optical absorption region provided for an optical modulator.

17. The semiconductor optical device according to claim 11, wherein the active layer includes an optical absorption region provided for a semiconductor photodetector.

18. The semiconductor optical device according to claim 11,
wherein the semiconductor portion includes a first portion provided to constitute one of an optical modulator and a semiconductor photodetector, and a second portion provided to constitute a semiconductor light generation element, and
wherein an impurity concentration of the first semiconductor layer has a highest value smaller than that of the second semiconductor layer.

19. A semiconductor optical device comprising:
a semiconductor substrate of a first conductive type;
a semiconductor portion including first and second III-V compound semiconductor layers and an active layer, the semiconductor portion being provided on the semiconductor substrate, and the semiconductor portion having a side face extending in a direction of a predetermined axis, the active layer being provided between the first and second III-V compound semiconductor layers;
a multilayer semiconductor portion provided on the semiconductor substrate and the side face of the semiconductor portion; and
a second conductive type semiconductor layer provided on the semiconductor portion and the multilayer semiconductor portion;
wherein the multilayer semiconductor portion has first to 2n-th semiconductor layers sequentially arranged on the semiconductor substrate, where the number n is equal to or more than two,
wherein the first semiconductor layer is provided on the semiconductor substrate and the side face of the semiconductor portion,
wherein the 2m-th semiconductor layer is a first conductive type III-V compound semiconductor layer, where the number m is integer and not more than n,
wherein the (2m−1)-th semiconductor layer is a second conductive type III-V compound semiconductor layer, and
wherein each layer of the first to 2n-th semiconductor layers is adjacent to another layer of the first to 2n-th semiconductor layers to constitute one of a pn junction and a pin junction.

20. A semiconductor optical device comprising:
a first conductive type III-V compound semiconductor portion extending along a first reference plane intersecting a predetermined axis;
a second conductive type III-V compound semiconductor portion extending along a second reference plane intersecting the predetermined axis;
a semiconductor portion having side faces, the semiconductor portion being provided between the first conductive type III-V compound semiconductor portion and the second conductive type III-V compound semiconductor portion, the semiconductor portion including first and second III-V compound semiconductor layers and an active layer, the active layer being provided between the first and second III-V group compound semiconductor layers; and
a multilayer semiconductor portion having first to 2n-th semiconductor layers, the first to 2n-th semiconductor layers being provided sequentially between the first conductive type semiconductor portion and the second conductive type semiconductor portion, the multilayer semiconductor portion being provided on the side faces of the semiconductor portion;
wherein the 2m-th semiconductor layer has a first conductive type, where the number m is integer and not more than n,
wherein the (2m−1)-th semiconductor layer has a second conductive type, and
wherein each layer of the first to 2n-th semiconductor layers is adjacent to another layer of the first to 2n-th semiconductor layers to constitute one of a pn junction and a pin junction.

* * * * *